US010614374B2

(12) United States Patent
Naveh

(10) Patent No.: US 10,614,374 B2
(45) Date of Patent: Apr. 7, 2020

(54) CLASSIFYING ONLINE SYSTEM USERS BASED ON THEIR PROPENSITY TO ADOPT INNOVATIONS IN A SUBJECT AREA

(71) Applicant: Facebook, Inc., Menlo Park, CA (US)

(72) Inventor: Barak Reuven Naveh, Hod Hasharon (IL)

(73) Assignee: Facebook, Inc., Menlo Park, CA (US)

( * ) Notice: Subject to any disclaimer, the term of this patent is extended or adjusted under 35 U.S.C. 154(b) by 1330 days.

(21) Appl. No.: 14/742,495

(22) Filed: Jun. 17, 2015

(65) Prior Publication Data

US 2016/0371595 A1     Dec. 22, 2016

(51) Int. Cl.
 *G06N 20/00* (2019.01)
 *G06F 16/2457* (2019.01)
 *G06F 16/28* (2019.01)
 *G06N 5/02* (2006.01)

(52) U.S. Cl.
 CPC ....... *G06N 20/00* (2019.01); *G06F 16/24578* (2019.01); *G06F 16/285* (2019.01); *G06N 5/025* (2013.01)

(58) Field of Classification Search
 CPC . G06F 16/24578; G06F 16/285; G06N 5/025; G06N 20/00; G06Q 30/0255
 See application file for complete search history.

(56) References Cited

U.S. PATENT DOCUMENTS

| | | | |
|---|---|---|---|
| 9,081,808 B1* | 7/2015 | Kiveris | G06Q 30/0251 |
| 9,152,675 B2* | 10/2015 | Faller | G06F 17/3053 |
| 9,317,869 B2* | 4/2016 | Garcia-Martinez | G06Q 30/0251 |
| 2009/0026255 A1* | 1/2009 | Besecker | G06Q 20/208 235/375 |
| 2010/0274815 A1* | 10/2010 | Vanasco | G06F 17/30867 707/798 |
| 2014/0025735 A1* | 1/2014 | Garcia-Martinez | G06Q 30/0251 709/204 |
| 2014/0149501 A1* | 5/2014 | Kao | G06Q 30/0261 709/204 |
| 2014/0280236 A1* | 9/2014 | Faller | G06F 17/3053 707/749 |
| 2016/0180246 A1* | 6/2016 | Vickrey | G06F 17/30864 706/12 |
| 2016/0321703 A1* | 11/2016 | Huang | G06Q 30/0269 |
| 2016/0371595 A1* | 12/2016 | Naveh | G06N 5/048 |
| 2017/0337250 A1* | 11/2017 | Li | G06F 17/30554 |

* cited by examiner

*Primary Examiner* — Benjamin P Geib
(74) *Attorney, Agent, or Firm* — Fenwick & West LLP

(57) ABSTRACT

An online system classifies users based on their propensity to adopt one or more innovations in a subject area. To classify the users, the online system maintains information associated with one or more actions performed by the user and content provided by the user, with actions and the content associated with adopting one or more innovations in the subject area. The online system determines a score for a pairing of the user and the subject area based on the maintained one or more actions and/or the content associated with adopting the one or more innovations in the subject area. Based on the determined score, the online system determines an innovation adoption label for the user that represents a propensity of the user to adopt one or more innovations in the subject area.

20 Claims, 3 Drawing Sheets

CLASSIFYING ONLINE SYSTEM USERS BASED ON THEIR PROPENSITY TO ADOPT INNOVATIONS IN A SUBJECT AREA

BACKGROUND

This disclosure relates generally to maintaining information describing online system users, and more particularly to classifying online system users based on their propensity for adopting innovations in a subject area.

An online system allows users to connect to and to communicate with other users of the online system. Users create profiles on an online system that are tied to their identities and include information about the users, such as interests and demographic information. The users may be individuals or entities, such as corporations or charities. Content items are presented to various users by the online system to encourage users to interact with the online system.

With the increasing popularity of online systems, such as a social networking system, the online systems periodically add new features and/or new versions of existing features to improve the experience of its users. It is important for the online system that the newly introduced features actually improve the user experience especially when the new features replace existing features. While the online systems typically test the new features to ensure that they meet sufficient quality metrics, new features tend to have bugs especially in the first couple of releases.

Conventionally, an online system provides new features or new versions of existing features to various users of the online system once the new features or new versions are available. However, this conventional practice does not account for different tolerance levels of different users for changes or modifications to products or services used by different users when deciding whether to provide various new features to different users. By providing new features or versions to users regardless of the users' tolerance for changes or modifications, many users with low tolerance for change will have a degraded user experience from adapting to new features or when new features perform sub-optimally. Degradation of various users' experiences may increase the risk of users who are frustrated by new features reducing their interaction with the online system.

SUMMARY

To better provide content to users, an online system classifies its users based on their propensity for adopting one or more innovations in one or more subject areas. For example, the online system generates a label associated with a user describing the user's propensity for adopting innovations in a subject area. In some embodiments, the online system associates multiple labels with a user, with each label identifying the user's propensity for adopting innovations in a different subject area. For example, a label describing a user's propensity for adopting innovations in a subject area provides an indication of an amount of time between an innovation in the subject area and the user using the innovation. Example subject areas include technology, music, sports, food, and the like. The online system may account for the classification of a user for adopting innovations in a subject area when providing content to the user. For example, the online system determines when to provide new features provided by the online system to users based at least in part on classifiers describing the users' propensity for adopting innovations in technology. As a specific example, the online system provides new features to different users at times based on classifiers associated with the users describing their propensity for adopting innovations in technology, so the online system initially provides new features to users associated with classifiers indicating they adopt innovations in technology within a threshold time interval of an innovation becoming available and subsequently provides the new features to other users associated with classifiers indicating the other users adopt innovations in technology after the threshold time interval of the innovation becoming available. Staggering distribution of new features to users with different propensities for adopting technology improves user interaction with the online system by providing new features of the online system to different users when the users are more likely to use the new features.

To classify a user based on its propensity to adopt one or more innovations in a subject area, the online system maintains information describing actions performed by the user and maintains content provided to the online system by the user. One or more of the actions describe the user adopting one or more innovations in a subject area. Similarly, at least a subset of the content provided to the online system is associated with one or more innovations in the subject area. For example, actions describing the user adopting innovations in a subject area of technology include actions where the user ordering or purchasing a product including a new or upgraded technology (e.g., buying a new smartphone), actions where the user installed or upgraded software, actions where the user downloaded an application, or other suitable actions. Example content associated with an innovation in the subject area include a user providing ratings or feedback on new products or features of a product (e.g., a user providing comment on upgraded features of a web-based email service), reviews of a product or service received from the user, comments by the user on reviews or other content associated with a product or service received from other users, or other suitable content.

The online system retrieves actions associated with the user that describe the user adopting innovations in the subject area, with each retrieved action associated with a time when the retrieved action was performed. For example, a retrieved action describing the user's purchase of a new technology product includes a time when the user purchased the new technology product. Additional characteristics may be associated with various retrieved actions. Example characteristics of an action include: a type of the action, a third party system associated with the action, a description of an object associated with the action (e.g., a product, a comment, content), a location associated with the action, or other suitable information.

Additionally, the online system retrieves content provided by the user from the maintained information that is associated with one or more innovations in the subject area. In some embodiments, the online system retrieves content including one or more keywords associated with the subject area or retrieves content associated with one or more topics associated with the subject area. The retrieved content has various characteristics. Example characteristics associated with content include a time associated with the content (e.g., a time when the online system received the content, a time identified by the content), a sentiment of the content (e.g., a sentiment determined from analysis of text in the content), ratings included in the content, or other suitable information. In some embodiment, a characteristic of the content describes the content relative to content associated with other users and associated with a keyword or a topic matching a keyword or a topic of the content associated with the user. For example, a characteristic of retrieved content is a difference between a rating of a product identified by the retrieved content and an average rating of the product identified by content from other online system users.

Based on the retrieved actions describing adoption of innovations in the subject area by the user and the retrieved content associated with one or more innovations in the subject area, the online system determines a score for a pairing of the user and the subject area. In various embodiments, the online system applies one or more models to characteristics of the actions describing adoption of innovations in the subject area by the user and characteristics of the retrieved content associated with one or more innovations in the subject area to determine the score for the pairing of the user and the subject area. For example, a number of various types of actions describing adoption of innovations in the subject area and times associated with the various types of actions describing adoption of innovations in the subject area are used to determine the score. Example actions and characteristics of actions for determining the score include: the online system determines a number of messages identifying an action associated with the subject area the user received from the online system before the user performed the action, a number of messages received by the user from other online system users (e.g., additional users connected to the user) identifying an action associated with the subject area before the user performed the action, a number of messages associated with a subject area (e.g., recommendations to perform an action) the user provides to other users, a time difference between an action indicating the user performed an action associated with the subject area and a time when the action was initially capable of being performed (e.g., a time duration between a time when the user buys a smartphone and a time when the smartphone was available for purchase). In some embodiments, when determining the score for the pairing of user and subject area, the online system accounts for a measure of the user's influence on actions taken by other online system users. For example, the measure of the user's influence provides a measure of how the user performing an action affects other users of the online system performing the action or performing a similar action.

Additionally, the online system uses characteristics of content provided to the online system by the user and associated with one or more innovations in the subject area when determining the score for the pairing of the user and the subject area in some embodiments. For example, a difference between the user's ratings of a new product in the subject area relative to an average rating for the product from other online system users is a factor used to determine the score for the pairing of the user and the subject area. Other characteristics of content provided to the online system by the user and associated with innovations in the subject area may be used to determine the score in other embodiments, such as a sentiment of the user towards one or more innovations in the subject area determined by textual analysis of content provided to the online system by the user and associated with the innovations in the subject area. In other embodiments, the online system may determine the score based on the actions describing adoption of innovations in the subject area without accounting for content provided to the online system by the user that is associated with one or more innovations in the subject area. Alternatively, in some embodiments, the online system determines the score based on characteristics content provided to the online system by the user that is associated with one or more innovations in the subject area without considering actions describing adoption of innovations in the subject area by the user.

The online system may determine scores associated with parings of the user and different subject areas. For example, the online system determines scores associated with pairings of the user and various subject areas such as technology, music, food, and sports. Determining scores for different pairings of the user and subject areas allows the online system to maintain information identifying the user's propensity for adopting innovations in different subject areas. As an example, a score for a pairing of the user and technology indicates the user has a high propensity for adopting innovations in technology, while a score for a pairing of the user and music indicates the user has a low propensity for adopting innovations, or changes, in music.

Based on the score associated with a pairing of the user and the subject area, in various embodiments, the online system generates an innovation adoption label for the user and the subject area. In one embodiment, the online system associates different innovation adoption labels with different ranges of scores and generates an innovation adoption label for the user and the subject area that corresponds to a range of score including the score associated with the pairing of the user and the subject area. Hence, different innovation adoption labels correspond to different propensities of the user for adopting innovations in the subject area. Different innovation adoption labels may correspond to different time ranges when the use is likely to adopt innovations in the subject area. For example, an innovation adoption label corresponds to the user adopting innovations within a threshold time interval of the innovations being available, while an additional innovation adoption label corresponds to the user adopting innovations greater than the threshold time interval from a time when the innovations are available but less than an additional time interval from the time when the innovations are available. Innovation adoption labels associated with various pairings of the user and subject areas are stored by the online system in association with the user.

An innovation adoption label associated with a pairing of the user and the subject area may be used by the online system or by third party systems to identify content for presentation to the user. For example, a third party system provides a content item to the online system identifying the subject area and an innovation adoption label as targeting criteria, so the online system determines the user is eligible to be presented with the content item if the innovation adoption label associated with the pairing of the user and the subject area matches the innovation adoption label identified by the targeting criteria. As another example, the online system provides different functionality to users based at least in part on their innovation adoption label for pairings of the user and a subject area. For example, the online system more quickly provides additional features or functionality to users having a particular innovation adoption label associated with a pairing of the users and a subject area of technology.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

System Architecture

Figure 1:
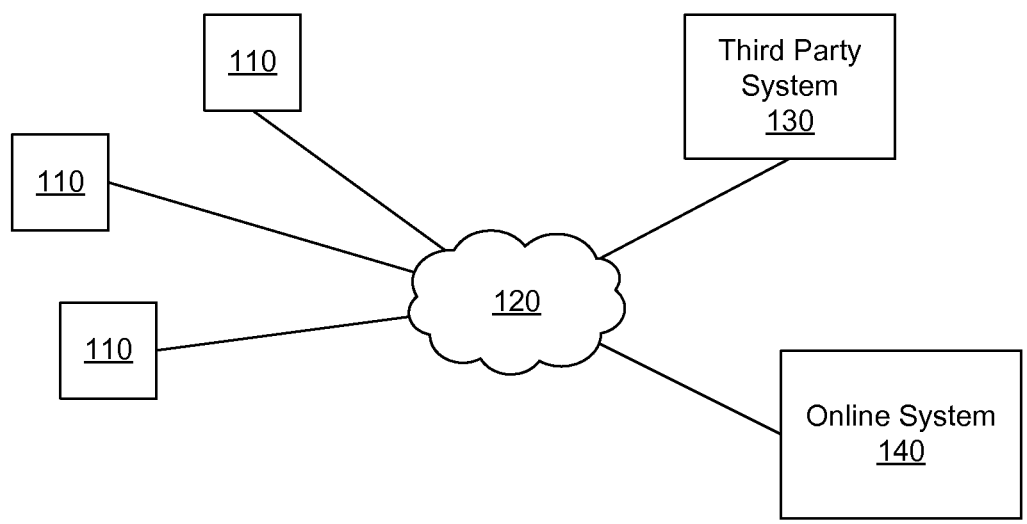
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
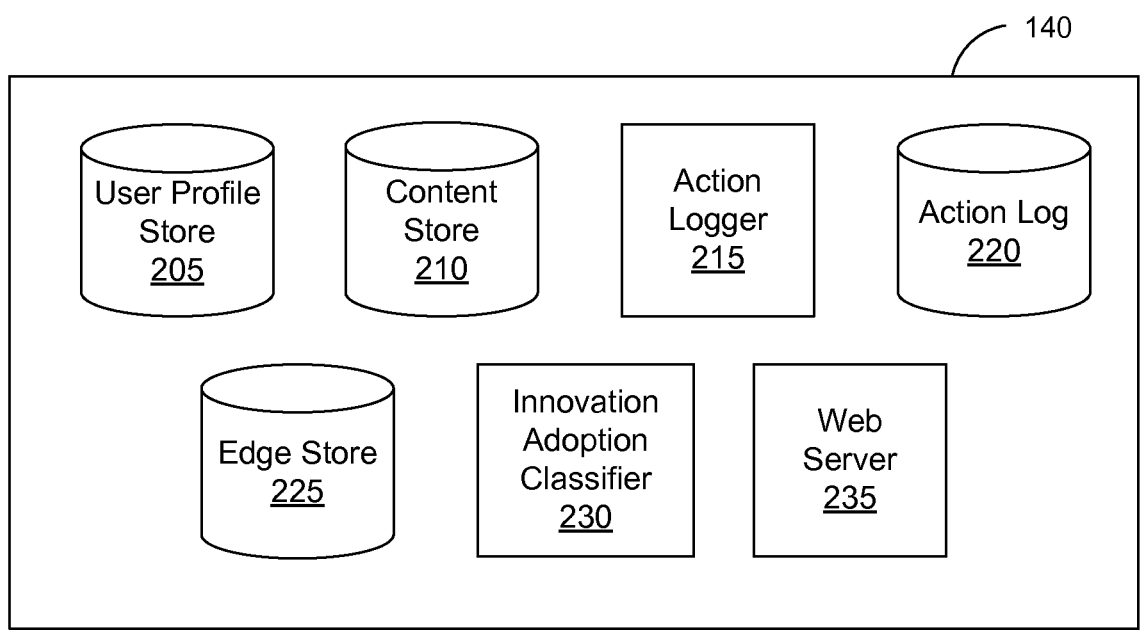
FIG. 2 is a block diagram of an online system, in accordance with an embodiment.

FIG. 2 is a block diagram of an architecture of the online system 140. For example, the online system 140 is a social networking system. The online system 140 shown in FIG. 2 includes a user profile store 205, a content store 210, an action logger 215, an action log 220, an edge store 225, an innovation adoption classifier 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged and stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the online system 140, events, reviews of products or services purchased or used by the users, comments on content provided by other users of the online system 140, groups, events, or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. In various embodiments, the action log 220 is populated with information identifying actions performed by a user that includes times when the user performed various actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, interactions with advertisements, purchases made, and other patterns from shopping and buying. Additionally, actions a user performs via an application associated with a third party system 130 and executing on a client device 110 may be communicated to the action logger 215 by the application for recordation and association with the user in the action log 220.

Certain actions performed by the user and stored in the action log 220 describe adoption of one or more innovations in a subject area by various users. As used herein, an "innovation" refers to a change to products, services, or information associated with a subject area. A subject area refers to a field of knowledge or field of topics. Example subject areas include: technology, sports, food, travel, automobiles, movies, television, or other suitable groupings of topics. Different embodiments may differently identify subject areas. For example, an embodiment includes specific subject areas identifying different genres of movies. Example actions describing adoption of an innovation in a subject area include: purchasing a new product in a subject area (e.g., buying a new smartphone), upgrading to a new version of a product in the subject area (e.g., upgrading to a new version of software), providing messages to other users regarding an innovation in the subject area, receiving messages from additional users or from the online system 140 regarding the innovation in the subject area, or other suitable actions. Stored information associated with an action describing adoption of innovations in a subject area by the user may include information identifying one or more additional users associated with the action (e.g. an additional user from whom a message was received, an additional user who received the message), a time when the action occurred, and content associated with the action.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The innovation adoption classifier 230 includes the user in a category associated with a subject area, where the category identifies the user's propensity for adopting innovations in the subject area. In various embodiments, the innovation adoption classifier 230 classifies the user into a category based on one or more actions performed by the user describing adoption of innovations in the subject area by the user and content provided by the user that is associated with innovations in the subject area. Example actions describing adoption of innovations in the subject area include: purchasing a product associated with the subject area (e.g., buying a new smartphone), upgrading a product associated with the subject area, communicating a message to an additional user identifying a product associated with the subject area, and the like. Example content associated with one or more innovations in the subject area include ratings from the user on new products or features of a product (e.g., a user providing comment on upgraded features of a web-based email service) in the service area, reviews from the user of products or services associated with the subject area or new features of products or services associated with the subject area, content from the future describing products or services associated with the subject area, and the like. In some embodiments, the innovation adoption classifier 230 classifies the user into a category based on one of the actions describing adoption of innovations in the subject area by the user and the content provided by the user associated with innovations in the subject area.

In various embodiments, innovation adoption classifier 230 retrieves information associated with actions describing the user's adoption of innovations in a subject area or content provided by the user and associated with innovations in the subject area from the content store 210, the action log 220, and/or the edge store 225. Retrieved information associated with actions describing the user's adoption of innovations in the subject area includes times associated with the actions specifying times when the user performed the actions. For example, a retrieved action describing a purchase of a new product associated with a subject area includes a time when the user purchased the product. Additional characteristics of actions describing adoption of innovations in the subject area may also be included in the retrieved information. Example characteristics include: additional users associated with the action (e.g., an additional user receiving a message, an additional user who sent a message), and a location associated with the action. For example, a retrieved action is a message for the user to perform an action relating to an innovation in the subject area that identifies a source of the message (e.g., another user of the online system 140, the online system 140, a third party system 130, etc.) and that is associated with a time when the message was sent to the user or a time when the message was received by the user, as well as content included in the message. As another example, a retrieved action is a message sent by the user after the user performed an action adopting an innovation in the subject area; characteristics of the retrieved action identify one or more users who received the message, a time when the user sent the message, and content included in the message.

Content associated with the user adopting one or more innovations in the subject area and provided to the online system 140 is also associated with one or more characteristics. Example characteristics associated with content are one or more of: a time when the online system 140 received the content, a sentiment towards an innovation associated with the content (e.g., from textual analysis of the content), a review of the innovation associated with the subject area, and a rating of the innovation associated with the subject area by the user. Content provided to the online system 140 by the user may include one or more ratings of one or more innovations in the subject area provided by the user. For example, the user provides the online system 140 with ratings of a new sports streaming service to which the user subscribed. Based on content provided to the online system 140 associated with innovations in the subject area and content provided to the online system 140 by other users associated with the innovations in the subject area, innovation adoption classifier 230 may determine a difference between a rating of the user for an innovation in the subject area and an average rating of the innovation by other users.

Based on actions describing user adoption of innovations in a subject area or content provided to the online system 140 describing innovations in the subject area, the innovation adoption classifier 230 determines a score for a pairing of the user and a subject area. In various embodiments, one or more machine learned models are applied to characteristics of the actions describing user adoption of innovations associated with the subject area and characteristics of content associated with innovations associated with the subject area provided by the user to generate the score for the pairing of the user and the subject area. For example, the model determines a score for the pairing of user and subject area based on times associated with actions describing the user adopting one or more innovations in the subject area and times when a described action was initially able to be performed. As an example, the score for a user is based at least in part on a difference between the time when an action describes the user purchasing a product and a time when the product was initially available for purchase. In various embodiments, higher scores are associated with action describing the user adopting an innovation associated with times that are temporally nearer to times when the actions were initially capable of being performed. Characteristics of retrieved content associated with one or more innovations in the subject area may also be used when determining the score for the paring of the user and the subject area, such as a sentiment of the user towards an innovation associated with content provided to the online system 140 by the user or ratings of the innovation by the user. In various embodiments, the score may be determined based on the retrieved actions, based on the retrieved content, or based on a combination of the retrieved actions and the retrieved content. Determining a score associated with the pairing of user and subject area is further described below in conjunction with FIG. 3.

In some embodiments, the innovation adoption classifier 230 determines scores associating with various parings of a user and different subject areas. Scores associated with various pairings of the user and subject areas are stored by the innovation adoption classifier 230 in the user profile associated with the user. The innovation adoption classifier 230 also associates an innovation adoption label with a pairing of the user and a subject area based on the score associated with the pairing of the user and the subject area. For example, different innovation adoption labels are associated with different ranges of scores, allowing an innovation adoption label to indicate a propensity of the user for adopting innovations in the subject area. Maintaining innovation adoption labels for the user associated with different subject areas allows the online system 140 to maintain information identifying the user's propensity for adopting innovations in different subject areas that may be used to identify content for presentation to the user in the different subject areas. Determining an innovation adoption label associated with a pairing of the user and a subject area is further described below in conjunction with FIG. 3.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Figure 3:
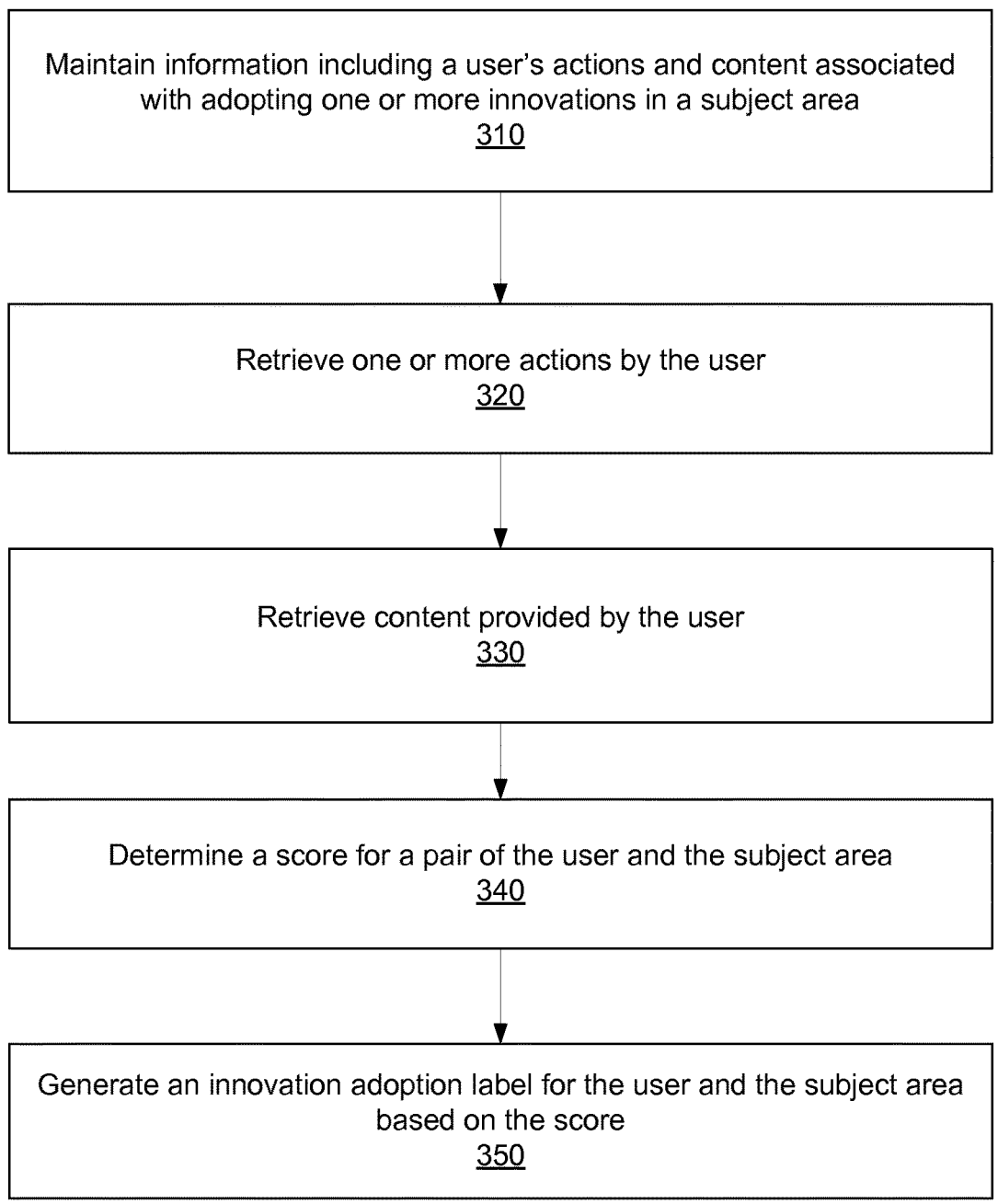
FIG. 3 is flowchart of an example process for classifying users of an online system based on their propensity for adopting one or more innovations in a subject area, in accordance with an embodiment.

Classifying Users Based on their Propensity to Adopt Innovations in a Subject Area FIG. 3 is flowchart of one embodiment of a process for classifying users of an online system 140 based on their propensity to adopt one or more innovations in a subject area. In some embodiments, the process may include different or additional steps than those described in conjunction with FIG. 3. Additionally, in some embodiments, the steps of the method may be performed in different orders than the order described in conjunction with FIG. 3.

The online system 140 maintains 310 information associated with a user including actions performed by the user and content provided to the online system 140 by the user. Various actions associated with the user and content provided by the user may be associated with a subject area. As described above in conjunction with FIG. 2, a subject area refers to a field of knowledge or field of topics. Example subject areas include technology, music, food, clothes, fashion, home improvement, kids, entertainment, health, books, sports, finance, and the like. In one embodiment, the maintained information includes one or more actions describing the user's adoption of innovations in the subject area. Example actions describing the user's adoption of innovations in the subject area include: the user purchasing a new product or service in the subject area, the user upgrading a product or service in the subject area, communicating a message describing a new product or service in the subject area to one or more additional users, receiving a message describing a new product or service in the subject area from an additional user, installing an application associated with the subject area, or other suitable actions. Additionally, the maintained information may include content provided to the online system 140 by the user (or otherwise associated with the user) that is associated with one or more innovations in the subject area. Example content associated with one or more innovations in the subject area includes: ratings by a user of a product or a service associated with the subject area, reviews of a product or a service associated with the subject area by the user, content describing a product or a service associated with the subject area, or other suitable content associated with the subject area. In some embodiments, the online system 140 maintains 310 one of the actions describing adoption of innovations in the subject area by the user and the content associated with the subject area by the user.

Actions describing adoption of one or more innovations in the subject area maintained 310 by the online system 140 are associated with times when the actions were performed or times when the online system 140 received information describing the actions. In some embodiments, an action describing adoption of one or more innovations in the subject area also identifies a time when the action was initially capable of being performed (e.g., a release date of a product or a service) or a difference between a time when the action was performed and the time when the action was initially capable of being performed. For example, each action describing adoption of an innovation in the subject area by the user includes a time when the action was initially capable of being performed (e.g., a time when a product or service was initially available for purchase, a time when a product or service was initially available to be reserved).

For example, actions describing adoption of an innovation in the subject area by the user include messages received by the user and actions subsequently performed by the user in response to the messages. For example, the user receives a message (e.g., a reminder message) that a new food-related product is available in the market and is available for purchase via the online system 140 or via a third party system 130. In one embodiment, the user may receive multiple messages to perform an action before performing the action; hence, information identifying an additional user (or other source) sending the message to the user, the content of the message, the user, and a time when the message was sent to the user is maintained in association with the message. If the user subsequently performs an action identified by a message (e.g., purchases the new food-related product from the preceding example), the online system 140 maintains information describing the action that includes a time when the user performed the action. The user may receive messages to perform one or more actions from the online system 140 itself or from a third party system 130 rather than from an additional user in some embodiments. For example, the online system 140 provides advertisements or recommendations to perform actions to the user from advertisements and recommendations to perform actions stored by the online system or received from a third party system 130. As an example, a food-related business external to the online system 140 provides one or more advertisements for a new food product to the online system 140, which selects one or more of the advertisements for presentation to a user. The online system 140 stores information identifying a message presented to the user by the online system 140 or by a third party system 130 as well as a time when the message was presented, an identifier of the online system 140 or of the third party system 130, and content of the message. As described above, if the user subsequently performs an action identified by a message, the online system 140 stores information describing the action that includes a time when the action was performed.

Messages identifying an action relating to an innovation in the subject area (e.g., messages to perform an action) may also be provided to the user by additional users of the online system 140, and information describing these messages. For example, the user receives messages identifying an innovation to adopt in the subject area or messages encouraging the user to perform one or more actions to adopt the innovation in the subject area from one or more additional users connected to the user via the online system 140. As described above, information stored by the online system 140 identifying a message identifies the additional user from which the message was received, a time when the additional user sent the message, and content included in the message. Similarly, the online system 140 maintains information describing messages sent by the user to additional user associated with one or more innovations in the subject area. For example, after purchasing a new music album, the user provides messages to other users connected to the user via the online system 140 recommending the other users also purchase the music album. Information maintained by the online system 140 identifies the user who sent the message, an additional user receiving the message, a time when the user sent the message to the additional user, and content included in the message. If an additional user who received a message associated with an innovation in the subject area from the user performs an action adopting the innovation, the online system 140 also stores information describing the action and the time when the additional user performed the action, as described above. If one or more other users also purchase the new music album identified by the messages in the preceding example, the online system 140 maintains information identifying another user who purchased the new music album and a time when the other user purchased the new music album.

In some embodiments, the maintained information also includes content provided by the user to the online system 140 associated with one or more innovations in the subject area. For example, the user provides content to the online system 140 reviewing a product or a service in the subject area, describing a product or a service in the subject area, rating a product or service in the subject area, or other information describing or referencing a product, a service, or another innovation in the subject area. The content may be posted to the online system 140 by the user, may be a comment by the user on content provided to the online system 140 by an additional user, or may be any other suitable form of content. The online system 140 may receive content associated with an innovation in the subject area from a third party system 130 that the user provided to the third party system 130 and maintain 310 the content in association with the user. The online system 140 may associate a time with content provided by the user to the online system 140 that indicates when the content was received by the online system 140. For example, the user provides a review of a new technology product that the user bought either at the online system 140 or outside of the online system 140 and the online system 140 stores a time when the online system 140 received the content from the user.

The online system 140 may analyze content provided by the user to the online system 140 to determine an innovation in a subject area or a subject area associated with the content. For example, the online system 140 identifies topics associated with content from the user and identifies one or more subject areas corresponding to the identified topics. To identify topics associated with content items, the online system 140 may identify anchor terms included in the content and determine a meaning of the anchor terms as further described in U.S. patent application Ser. No. 13/167,701, filed Jun. 24, 2011, which is hereby incorporated by reference in its entirety. Based on stored associations between topics and subject areas, the online system 140 identifies a subject area associated with the content. Additionally, the online system 140 may identify keywords (e.g., product names, service names, links to a product or to a service) in the content to determine an innovation in the subject area associated with the content.

In one embodiment, the content provided by the user includes one or more ratings associated with one or more innovations in a subject area. For example, the user provides ratings of a new sports streaming service that the user subscribed to via the online system 140 or via a third party system 130. Ratings of an innovation provided by other users may also be maintained by the online system 140, allowing the online system 140 to determine a difference between a rating of an innovation provided by the user and ratings of the innovation provided by other users (e.g., a difference between the user's rating and an average rating from other users).

The online system 140 retrieves 320 one or more actions performed by the user that describe adoption of one or more innovations in the subject area from the maintained information. As described above, each action performed by the user is associated with a time when the user performed the action. For example, a retrieved user action associated with a purchase of a new technology product includes a time when the user purchased the new technology product. Additional characteristics may be associated with the actions performed by the user in various embodiments. Example characteristics of an action include: a type of the action, a third party system associated with the action, a description of an object associated with the action (e.g., a product, a comment, content), a location associated with the action, or other suitable information. Example types of actions include: purchasing a product or service, installing a product or a service, using a product or a service, providing a message about a product or a service to other users (e.g., inviting another user to user the product or the service), and receiving a message about a product or a service.

As described above, in some embodiments, an action describing adoption of one or more innovations in the subject area also identifies a time when the action was initially capable of being performed (e.g., a release date of a product or a service) or a difference between a time when the action was performed and the time when the action was initially capable of being performed. For example, each action describing adoption of an innovation in the subject area by the user includes a time when the action was initially capable of being performed (e.g., a time when a product or service was initially available for purchase, a time when a product or service was initially available to be reserved). The time when the action was initially capable of being performed may be stored in association with the action or may be separately stored and determined based on additional information stored by the online system 140 based on the innovation associated with the action.

In one embodiment, the retrieved actions include one or more messages sent by the user to other users identifying an innovation in the subject area or identifying an action associated with the innovation in the subject area for the additional users to perform. The online system 140 also maintains information with a message identifying an additional user who received the message, the user who sent the message, the content of the message, and a time when the user sent the message to the additional user. Actions performed by the additional users are also maintained and identified by the online system 140 to determine whether additional users performed an action associated with adopting an innovation identified by the messages after the additional users received the messages.

In some embodiments, the online system 140 also retrieves 330 content associated with one or more innovations in the subject area and provided to the online system 140 from the maintained information. The retrieved content may have various characteristics. For example, a characteristic associated with retrieved content is a time when the online system 140 received the content from the user or from a third party system 130. For example, a retrieved content item providing a review of a product or a service purchased by the user includes a time when the user provided the review to the online system 140. In some embodiments, the content may be associated with additional times, such as times associated with the content itself (e.g., times from the content identifying when the user prepared the review, times in the content identifying when the user used a product or service that was reviewed). In some embodiments, a characteristic of the content describes the content relative to content associated with other users and associated with a keyword or a topic matching a keyword or a topic of the content associated with the user. For example, a characteristic of retrieved content is a difference between a rating of a product identified by the retrieved content and an average rating of the product identified by content from other online system users. Other example characteristics associated with content include: a time associated with the content (e.g., a time when the online system received the content, a time identified by the content), a sentiment of the content (e.g., a sentiment determined from analysis of text in the content), ratings included in the content, or other suitable information. For example, information in the retrieved content may indicate the user has a high tolerance for dealing with any bugs associated with a newly released technology product.

The retrieved content may include one or more ratings of one or more innovations in the subject area provided by the user. For example, the user provides ratings of a product, a service, or a feature the user purchased or used via the online system 140 or external to the online system 140. In some embodiments, the online system 140 also retrieves content associated with the one or more innovations in the subject area provided by additional users and determines one or more differences between content provided by the user associated with the one or more innovations and content associated with the one or more innovations provided by other users. For example, the online system 140 determines a difference between the user's rating of an innovation in the subject area and an average rating of the innovation by additional users and stores the difference as a characteristic of the user's rating of the innovation. Similarly, the online system 140 may determine differences in sentiment of the user towards an innovation and sentiment of additional users towards the innovation based on semantic analysis of content provided by the user and by the additional users, respectively, and stores the differences in sentiment as a characteristic of the content provided by the user associated with the innovation in the subject area.

Based on the retrieved actions describing adoption of the one or more innovations in the subject area by the user, the online system 140 determines 340 a score for a pairing of the user and the subject area. In various embodiments, the online system 140 determines 340 the score for the pairing of the user and the subject area based on the retrieved actions and the retrieved content provided by the user associated with one or more innovations in the subject area. Alternatively, the online system 140 determines 340 the score for the pairing of the user and the subject area based on the retrieved content.

In one embodiment, the score for the pairing of the user and the subject area is determined 340 based at least in part on times associated with the retrieved one or more actions and on one or more characteristics of the retrieved content associated with the one or more innovations in the subject area. For example, a model is applied to characteristics of the retrieved content and characteristics of the retrieved actions, including times associated with the retrieved actions, to determine 340 the score. The score may be based at least in part on differences between times when various retrieved actions (e.g., when the user obtained a product or a service) were performed and times when the retrieved actions were initially capable of being performed (e.g., when the product or service was additionally available). In various embodiments, smaller differences between times when retrieved actions were performed and times when the retrieved actions were initially capable of being performed increase the score for the pairing of the user and the subject area.

When determining 340 the score for the pairing of the user and the subject area, various characteristics of the retrieved actions or the retrieved content may affect the score. For example, the online system 140 determines a number of messages identifying an action associated with an innovation that the user received from other users (or from the online system 140, or from the third party system 130) before the user performed the action. A larger number of messages received by the user before the user performs the action reduces the score in various embodiments. In some embodiments, the online system 140 determines a number of messages identifying an action or identifying an innovation the user receives from additional users before performing the action, a number of messages identifying an action or identifying an innovation the user receives from the online system 140 before performing the action, and a number of messages identifying an action or identifying an innovation the user receives from one or more third party systems 130 before performing the action. When determining 340 the score, the online system 140 may differently weight the number of messages from different sources the user received before performing an action to adopt an innovation in the subject area.

Additionally, the online system 140 may determine a number of messages the user communicates to additional users associated with times that are after a time when the user performed an action to adopt an innovation in the subject area, and accounts for the number of messages communicated by the user when determining 340 the score. In some embodiments, the online system 140 determines a number of discrete additional users to whom the user communicated a message. Alternatively, the online system 140 determines total number of messages communicated to additional users, which accounts for the user communicating multiple messages to certain additional users. In some embodiments, the online system 140 determines both a number of discrete additional users to whom the user communicates a message associated with the innovation and the total number of messages associated with the innovation that the user communicates to additional users.

In some embodiments, the online system also accounts for characteristics of content associated with one or more innovations in the subject area received from the user when determining 340 the score for the pairing of the user and the subject area. For example, the online system 140 determines a difference between the user's rating of an innovation in the subject area and an average rating of the innovation by additional users. In some embodiments, the online system 140 determines the average rating based on ratings of the innovation received from any additional users. Alternatively, the online system 140 determines the average rating based on ratings of the innovation received from additional users having at least a threshold number of specific characteristics. If the user's rating for the innovation is greater than the average rating for the innovation, the online system 140 increases the score, while the online system 140 decreases the score if the user's rating for the innovation is less than the average rating for the innovation. Similarly, differences between the user's sentiment towards an innovation determined from analyzing content associated with the innovation and an average sentiment towards the innovation of other users may increase or decrease the score. If the user's sentiment toward the innovation is more positive than the average sentiment, the online system 140 increases the score; similarly, if the user's sentiment toward the innovation is more negative than the average sentiment, the online system 140 decreases the score.

Additionally, an influencer score associated with the user may contribute to the score for the pairing of the user and the subject area determined 340 by the online system 140. The influencer score associated with user provides a measure of the influence of the user on actions performed by additional users connected to the user via the online system 140. For example, the influencer score associated with the user accounts for actions performed by additional users connected to the user because of the user's actions as well as actions that other users connected to the additional users perform because of the additional users' actions. In some embodiments, different influencer scores that correspond to different subject areas are associated with the user. For example, a user may share a link to a comment posted on a baseball-themed website. Because the link associated with the website is baseball-themed, the user's action of sharing the link is associated with the subject area of sports, and an influencer score determined based on the action is also associated with the subject area of sports. Subject area-specific influencer scores allow the online system 140 to more accurately describe the user's influence on other users in various subject areas.

In some embodiments the influencer score associated with the user is determined as:

$$F(u) = \Sigma_{c=1}^{i} G(u,c) F(c)$$

where, F(u) represents the influencer score for the user (u). G(u,c) is representative of the influence value for the user (u) with respect to an additional user connected to the user (c), and i specifies a number of additional users connected to the user (u). F(c) represents an influencer score of the additional user connected to the user (c). Determining an influencer score for a user is further described in U.S. patent application Ser. No. 13/429,126, filed on Mar. 23, 2012, which is hereby incorporated by reference in its entirety.

If the online system 140 determines the user's influencer score is high (e.g., equals or exceeds a threshold value), the online system 140 increases the score determined for the user. For example, the user's influencer score is compared to influencer ratings of other users or to an average influencer rating of users (or of users with a threshold number of characteristics matching characteristics of the user) to determine if the user's influencer score is high. If the user's influencer score exceeds the average influencer score of other users, the online system 140 increases the score determined 340 for the user; conversely, if the user's influencer score is less than the average influencer score, the online system 140 decreases the score for the user.

In some embodiments, the online system 140 combines the above-identified features to determine 340 the score for the pairing of the user and the subject area. The online system 140 may sum the various features to determined 340 the score in various embodiments. In some embodiments, the online system 140 applies various weights to various factors and combines the factors after application of the weights to determine 340 the score for the pairing of the user and the subject area. Different weights may be associated with different factors in some embodiments. Alternatively, each feature is equally weighted Different scores may be determined 340 for pairings of the user and different subject areas, as described above. For example, subject areas such as technology, music, food, sports, may each have a different score for the user. Determining 340 different scores for different pairings of the user and different subject areas allows the online system 140 to identify propensities of the user for adopting innovations in different subject areas.

Based on the determined score for the pairing of the user and the subject area, the online system 140 generates 350 an innovation adoption label for the pairing of the user and the subject area. The innovation adoption label provides an indication of the user's propensity for adopting one or more innovations in the subject area. In some embodiments, the online system 140 associates different innovation adoption labels with different ranges of scores, and generates 350 an innovation adoption label for the pairing of the user and the subject area that corresponds to a range of scores including the score determined 340 for the pairing of the user and the subject area. For example, different ranges of scores are associated with innovation adoption labels of "innovator," "early adopter," "early majority," "late majority," and "laggard," with one of the innovation adoption labels associated with a range that includes the score associated with the pairing of the user and the subject area generated 350 for the pairing of the user and the subject area. This example set of innovation labels is further described below in conjunction with FIG. 4. In various embodiments, higher scores for the pairing of the user and the subject area indicate a greater propensity for adopting innovations in the subject area, so innovation labels corresponding to higher ranges of scores indicate the user is more likely to adopt innovations in the subject area.

The ranges of scores associated with different innovation adoption labels may be selected using a rule-based model or a machine learning model. If the rule-based model is used, the online system 140 maintains rules associating different ranges of scores with different innovation adoption labels and applies one or more of the rules to the score for the pairing of the user and the subject area to generate 350 the innovation adoption label for the pairing of the user and the subject area. Different sets of rules may be used for determining ranges of scores corresponding to innovation adoption labels for different subject areas. If a machine learning model is applied, a model is presented with a data set of example ranges of scores corresponding to a subject area, a set of determined scores for pairings of users and the subject area, and innovation adoption labels in a supervised learning model, allowing the model to develop one or more rules for associating ranges of scores with different innovation adoption labels. Alternatively, a model is applied to determine scores for pairings of users the subject area, allowing the model to determine rules for correlating ranges of scores with different innovation adoption labels. Different models may be associated with different subject areas in various embodiments.

The online system 140 may generate 350 different innovation adoption labels for different pairings of the user and different subject areas. For example, the online system 140 generates 350 an "early adopter" innovation adoption label for a pairing of the user and technology and a "laggard" innovation adoption label for a pairing of the user and music. Different subject areas may include a different number of innovation adoption labels in various embodiments. An innovation adoption label for a pairing of the user and the subject area is stored in a user profile associated with the user by the online system 140, allowing subsequent use of the innovation adoption label.

In one embodiment, the innovation adoption labels associated with pairings of the user and subject areas may be used by the online system 140 when providing functionality of features to various users. For example, the online system 140 may identify users having a specific innovation adoption label associated with a subject area and provide the identified users with features or functionality corresponding to the subject area before providing the features or functionality to users having different innovation adoption labels with the subject area. As an example, the online system 140 provides one or more features to users at different times based on the innovation adoption labels for the users associated with a subject area including the features. Hence, users with innovation adoption labels corresponding to a higher propensity for adopting features receive the features earlier than other users with innovation adoption labels corresponding to a lower propensity for adopting features.

Additionally, innovation adoption labels for a user and different subject areas may be used to identify content for presentation to various users. For example, a third party system 130 provides a content item to the online system 140 identifying the subject area and an innovation adoption label as targeting criteria, so the online system 140 determines the user is eligible to be presented with the content item if the innovation adoption label associated with the pairing of the user and the subject area matches the innovation adoption label identified by the targeting criteria. This allows a third party system 130 or the online system 140 to tailor presentation of certain content to users at times when the user is likely to perform an action (e.g., use or purchase a product or service) when presented with the content. As an example, a third party system 130 may provide an advertisement to the online system 140 that includes targeting criteria identifying a subject area of technology and an innovation adoption label for technology of "early adopter." Hence, the online system 140 determines a user is eligible to be presented with the content if the innovation adoption label for the pairing of the user and technology is "early adopter."

Figure 4:
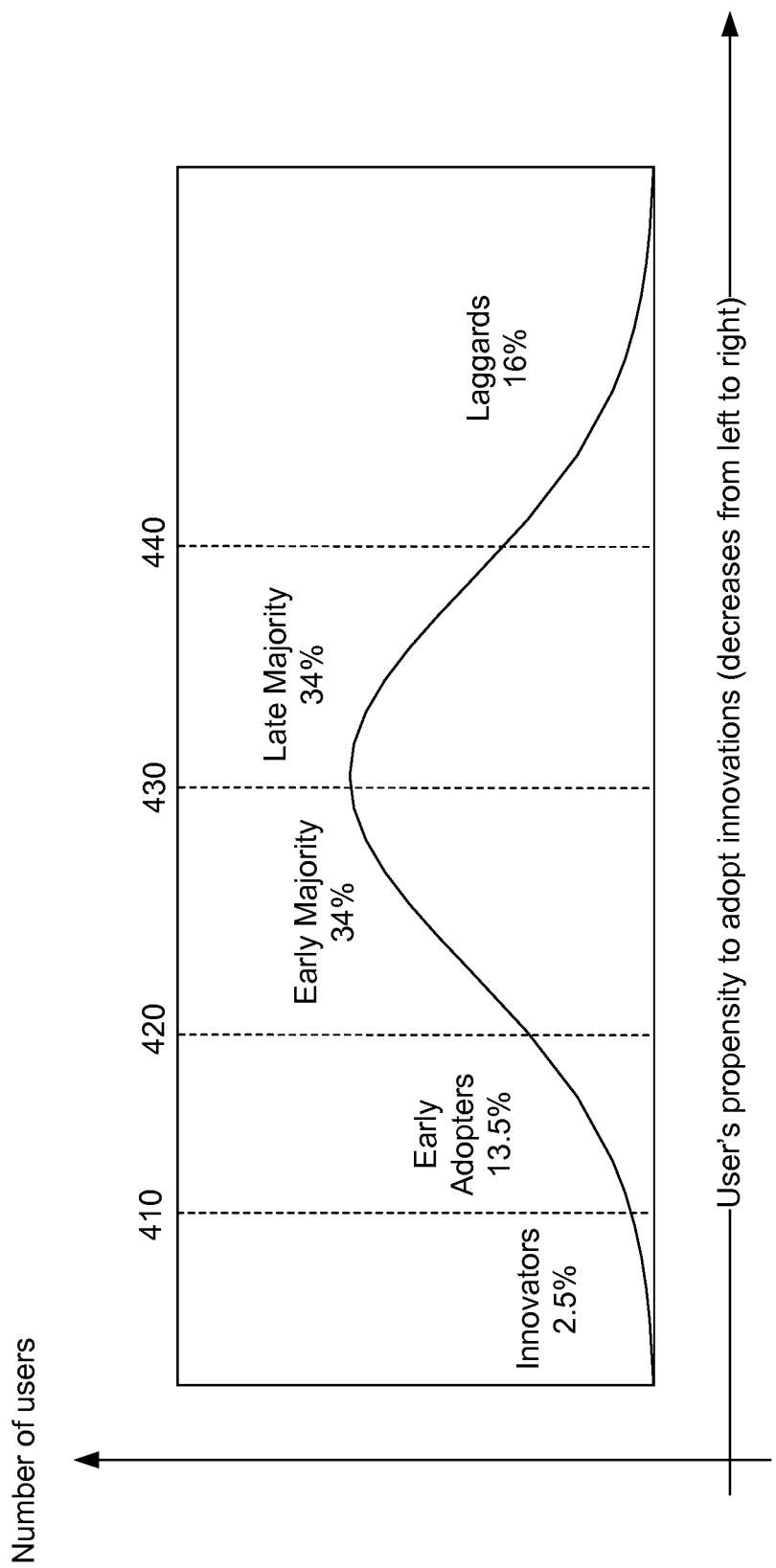
FIG. 4 shows an example classification of users based on their propensity for adopting one or more innovations in a subject area, in accordance with an embodiment.

Example User Classification Based on Propensity to Adopt Innovations in a Subject Area FIG. 4 shows an example classification of users based on their propensity for adopting one or more innovations in a subject area. In FIG. 4, the horizontal axis represents a user's propensity for adopting one or more innovations in a subject area, with the propensity decreasing in value from left to right. The vertical axis in FIG. 4 represents a number of users for a given propensity. For purposes of illustration, FIG. 4 shows four threshold propensities 410, 420, 430, and 440 that define five ranges of propensities. Different ranges of propensities may be associated with different subject areas, as described above in conjunction with FIG. 3.

In one embodiment, the user's propensity to adopt one or more innovations in a subject area is represented by a score determined for a pairing of the user and the subject area, as described above with reference to FIG. 3. Example innovation labels for the example classification shown in FIG. 4 include "innovators," "early adopters," "early majority," "late majority," and "laggards." The curve shown in FIG. 4 is similar to the Rogers bell curve defined for technology adoption cycle that labels the user based on their propensity to adopt innovations at different times after the innovations are available. Example definitions of the various labels of FIG. 4 are as follows:

Innovators: Users who are willing to take highest amount of risk in adopting innovations at a very early stage (i.e., users likely to adopt an innovation in the subject area within a threshold time of the innovation becoming available).

Early Adopters: Users who are willing to take high risk but not as high as innovators, and are more discreet in adopting innovations than innovators (i.e., users likely to adopt the innovation in the subject area after the threshold time but before an additional time after the innovation becomes available).

Early Majority: Users who adopt innovations at a time that is significantly longer when compared to innovators and early adopters (i.e., users likely to adopt an innovation in the subject area after the additional time but before a subsequent threshold time).

Late Majority: Users who adopt innovations after the average user. Late majority users approach innovations with a high degree of skepticism and typically wait till a majority of the society has already adopted the innovations (i.e., users likely to adopt an innovation in the subject area after the subsequent threshold time but before a final threshold time).

Laggards: Users who are typically averse to changes and are last to adopt innovations (i.e., users likely to adopt an innovation in the subject area after the final threshold time).

In one embodiment, the online system 140 generates the innovation adoption labels of FIG. 4 for a user by comparing the determined scores for the user and the subject area with that of the ranges of scores specified by the threshold propensities 410, 420, 430, 440. For example, if the online system 140 determines that the determined score for the user for the technology subject area is between threshold scores corresponding to threshold propensities 420 and 430, the online system 140 generates the innovation adoption label corresponding to the range between threshold propensities 420 and 430, which is an innovation adoption label of "early majority" in the example of FIG. 4.

SUMMARY

The foregoing description of the embodiments has been presented for the purpose of illustration; it is not intended to be exhaustive or to limit the patent rights to the precise forms disclosed. Persons skilled in the relevant art may appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which may be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:

maintaining, at an online system, information associated with a user, the information describing one or more actions associated with using one or more new capabilities of a software system in a subject area performed by the user and content associated with the one or more new capabilities of the software system in the subject area provided by the user to the online system, the software system executing in a computing device of the user;

retrieving the one or more actions associated with using the one or more new capabilities of the software system in the subject area from the maintained information, each action associated with a time when the user performed the action;

retrieving the content associated with the one or more new capabilities of the software system in the subject area provided by the user to the online system from the maintained information;

applying one or more machine learning models to one or more characteristics of the actions, and one or more characteristics of the content to generate a score associated with a pairing of the user and the subject area;

generating an innovation adoption label associated with the user and the subject area based at least in part on the score, the innovation adoption label representing a propensity of the user for using one or more new capabilities of the software system in the subject area; and providing a new capability of the software system to the user based on the generated innovation label.

2. The computer-implemented method of claim 1, wherein the one or more characteristics of the retrieved content comprises a time when the user provided the content to the online system.

3. The computer-implemented method of claim 1, wherein determining the score associated with the pairing of the user and the subject area comprises:

determining differences between times associated with retrieved one or more actions and times when the retrieved one or more actions were initially capable of being performed; and determining the score based at least in part on the determined differences.

4. The computer-implemented method of claim 1, wherein determining the score associated with the pairing of the user and the subject area comprises:

determining a number of messages received by the user associated with a new capability of the software system in the subject area received by the user at times prior to a time associated with an action associated with using the new capability of the software system in the subject area performed by the user from the retrieved one or more actions; and;

determining the score based at least in part on the determined number of messages.

5. The computer-implemented method of claim 4, wherein determining the number of messages received by the user associated with the new capability of the software system in the subject area received by the user at times prior to the time associated with the action associated with using the new capability of the software system in the subject area performed by the user from the retrieved one or more actions comprises:

determining a number of messages received by the user associated with a new capability of the software system in the subject area received from additional users by the user at times prior to a time associated with an action associated with using the new capability of the software system in the subject area performed by the user from the retrieved one or more actions.

6. The computer-implemented method of claim 4, wherein determining the number of messages received by the user associated with the new capability of the software system in the subject area received by the user at times prior to the time associated with the action associated with using the new capability of the software system in the subject area performed by the user from the retrieved one or more actions comprises:

determining a number of messages received by the user associated with a new capability of the software system in the subject area received from the online system by the user at times prior to a time associated with an action associated with using the new capability of the software system in the subject area performed by the user from the retrieved one or more actions.

7. The computer-implemented method of claim 1, wherein determining the score associated with the pairing of the user and the subject area comprises:
   determining a number of messages associated with a new capability of the software system in the subject area sent by the user to additional users of the online system; and;
   determining the score based at least in part on the determined number of messages.

8. The computer-implemented method of claim 1, wherein determining the score associated with the pairing of the user and the subject area comprises:
   determining a rating of a new capability of the software system in the subject area based at least in part on retrieved content associated with the one or more new capabilities of the software system in the subject area;
   determining an average rating of the new capability of the software system in the subject area based on content provided to the online system from additional users; and
   determining the score based at least in part on a difference between the determined rating and the determined average rating.

9. The computer-implemented method of claim 1, wherein determining the score associated with the pairing of the user and the subject area comprises:
   determining an influencer score associated with the user, the influencer score providing a measure of the influence of the user on actions performed by additional users connected to the user via the online system; and
   determining the score based at least in part on the influencer score associated with the user.

10. The computer-implemented method of claim 9, wherein determining the score based at least in part on the influencer score associated with the user comprises:
    increasing the score in response to determining the influencer score associated with the user is greater than a threshold value; and
    decreasing the score in response to determining the influencer score associated with the user is less than the threshold value.

11. The computer-implemented method of claim 1, wherein generating the innovation adoption label associated with the user and the subject area based at least in part on the score comprises:
    maintaining a plurality of innovation adoption labels, each innovation adoption label corresponding to a range of scores for the pairing of the user and the subject area; and
    associating an innovation adoption label corresponding to a range of scores including the score with the user.

12. A computer program product comprising a non-transitory computer readable storage medium having instructions encoded thereon that, when executed by a processor, cause the processor to:
    maintain, at an online system, information associated with a user, the information describing one or more actions associated with using one or more new capabilities of a software system in a subject area performed by the user and content associated with the one or more new capabilities of the software system in the subject area provided by the user to the online system, the software system executing in a computing device of the user;
    retrieve the one or more actions associated with using the one or more new capabilities of the software system in the subject area from the maintained information, each action associated with a time when the user performed the action;
    retrieve the content associated with the one or more new capabilities of the software system in the subject area provided by the user to the online system from the maintained information;
    applying one or more machine learning models to one or more characteristics of the actions, and one or more characteristics of the content to generate a score associated with a pairing of the user and the subject area;
    generate an innovation adoption label associated with the user and the subject area based at least in part on the score, the innovation adoption label representing a propensity of the user for using one or more new capabilities of a software system in the subject area; and
    provide a new capability of the software system to the user based on the generated innovation label.

13. The computer program product of claim 12, wherein the one or more characteristics of the retrieved content comprises a time when the user provided the content to the online system.

14. The computer program product of claim 12, wherein determine the score associated with the pairing of the user and the subject area comprises:
    determine differences between times associated with retrieved one or more actions and times when the retrieved one or more actions were initially capable of being performed; and
    determine the score based at least in part on the determined differences.

15. The computer program product of claim 12, wherein determine the score associated with the pairing of the user and the subject area comprises:
    determine a number of messages received by the user associated with a new capability of a software system in the subject area received by the user at times prior to a time associated with an action associated with using the new capability of the software system in the subject area performed by the user from the retrieved one or more actions; and;
    determine the score based at least in part on the determined number of messages.

16. The computer program product of claim 15, wherein determine the number of messages received by the user associated with the new capability of the software system in the subject area received by the user at times prior to the time associated with the action associated with using the new capability of the software system in the subject area performed by the user from the retrieved one or more actions comprises:
    determine a number of messages received by the user associated with a new capability of the software system in the subject area received from additional users by the user at times prior to a time associated with an action associated with using the new capability of the software system in the subject area performed by the user from the retrieved one or more actions.

17. The computer program product of claim 15, wherein determine the number of messages received by the user associated with the new capability of the software system in the subject area received by the user at times prior to the time associated with the action associated with using the new capability of the software system in the subject area performed by the user from the retrieved one or more actions comprises:

determine a number of messages received by the user associated with a new capability of the software system in the subject area received from the online system by the user at times prior to a time associated with an action associated with using the new capability of the software system in the subject area performed by the user from the retrieved one or more actions.

18. The computer program product of claim 12, wherein determine the score associated with the pairing of the user and the subject area comprises:

determine a number of messages associated with a new capability of the software system in the subject area sent by the user to additional users of the online system; and;

determine the score based at least in part on the determined number of messages.

19. The computer program product of claim 12, wherein determine the score associated with the pairing of the user and the subject area comprises:

determine a rating of a new capability of the software system in the subject area based at least in part on retrieved content associated with the one or more new capabilities of the software system in the subject area;

determine an average rating of the new capability of the software system in the subject area based on content provided to the online system from additional users; and determine the score based at least in part on a difference between the determined rating and the determined average rating.

20. The computer program product of claim 12, wherein generating the innovation adoption label associated with the user and the subject area based at least in part on the score comprises:

maintain a plurality of innovation adoption labels, each innovation adoption label corresponding to a range of scores for the pairing of the user and the subject area; and associate an innovation adoption label corresponding to a range of scores including the score with the user.

* * * * *